(12) United States Patent
Didcock et al.

(10) Patent No.: US 7,327,836 B2
(45) Date of Patent: Feb. 5, 2008

(54) ARCHITECTURE FOR UNIFIED MESSAGING

(75) Inventors: Clifford Neil Didcock, Wantage (GB); Charles Ronald Cook, Wakefield (GB); Michael Geoffrey Andrew Wilson, London (GB)

(73) Assignee: Avaya UK, Guildford, Surrey (GB)

( * ) Notice: Subject to any disclaimer, the term of this patent is extended or adjusted under 35 U.S.C. 154(b) by 964 days.

(21) Appl. No.: 10/151,486

(22) Filed: May 20, 2002

(65) Prior Publication Data

US 2004/0109544 A1 Jun. 10, 2004

(30) Foreign Application Priority Data

Jun. 29, 2001 (EP) ................................. 01305692

(51) Int. Cl.
*H04M 1/64* (2006.01)
(52) U.S. Cl. ................. 379/88.25; 379/88.13; 379/88.18
(58) Field of Classification Search ........... 379/88.13, 379/88.02, 88.18, 88.25; 455/413; 709/206; 725/34
See application file for complete search history.

(56) References Cited

U.S. PATENT DOCUMENTS

| 5,493,607 | A | * | 2/1996 | Arumainayagam et al. ...... 379/88.18 |
| 5,528,670 | A | * | 6/1996 | Elliot et al. ............... 379/88.25 |
| 5,557,659 | A | | 9/1996 | Hyde-Thomson |
| 6,778,642 | B1 | * | 8/2004 | Schmidt et al. .......... 379/88.13 |
| 6,782,079 | B2 | * | 8/2004 | Skladman et al. ........ 379/88.13 |
| 6,792,085 | B1 | * | 9/2004 | Rigaldies et al. ........ 379/88.13 |
| 6,888,927 | B1 | * | 5/2005 | Cruickshank et al. .... 379/88.25 |
| 2002/0098831 | A1 | * | 7/2002 | Castell et al. ............... 455/413 |
| 2002/0122541 | A1 | * | 9/2002 | Metcalf ................... 379/88.02 |

FOREIGN PATENT DOCUMENTS

EP 0 845 894 A2 11/1997

* cited by examiner

*Primary Examiner*—Gerald Gauthier
(74) *Attorney, Agent, or Firm*—Ryan, Mason & Lewis, LLP

(57) ABSTRACT

There is disclosed a unified messaging system in which a voice mail domain object comprising a plurality of fields is provided. At least one of such fields is selected to be defined as an open field such that it is accessible to an administration application of the system. The open fields are preferably stored as a voice mail domain summary in the e-mail directory of the unified messaging system.

15 Claims, 2 Drawing Sheets

ARCHITECTURE FOR UNIFIED MESSAGING

RELATED APPLICATION(S)

The present application claims the priority of European Patent Application No. 01305692.4 filed Jun. 29, 2001 and entitled "Improved Architecture for Unified Messaging."

FIELD OF THE INVENTION

The present invention relates to a multi-server environment where at least some configuration data is shared by the servers, and where such shared data is stored in a single data object the structure of which is valued to remain proprietary. The invention particularly, but not exclusively, relates to a unified messaging system.

BACKGROUND TO THE INVENTION

Unified messaging systems integrate several different communication media such that users are able to retrieve and send messages associated with the different media using a single interface. Typically, a unified messaging system integrates voice messaging systems with e-mail systems. The single interface may, for example, be a telephone or a PC. An example of a unified messaging system is disclosed in U.S. Pat. No 5,557,659.

A typical unified messaging system broadly provides an architecture in which at least one unified messaging voice server is provided as an interface, or voice gateway, between a PBX system and an e-mail system. A typical e-mail system includes at least one message store, a directory, at least one e-mail client, and a user administrator application.

To allow unified messaging systems to scale to support large deployments, a voice mail domain is created. The voice mail domain consists of a plurality of voice servers, which work together to exhibit the characteristics of a larger system. The voice mail servers preferably share unified messaging configuration data.

The unified messaging voice servers in a voice mail domain use the directory of the e-mail system to store the shared unified messaging configuration information. This unified messaging configuration information, shared by all voice servers within a voice mail domain, is stored in what is known as a voice mail domain object. Storing the voice mail domain directory object, containing the configuration information, in the directory provides a single copy of the shared configuration data conveniently accessible to all the voice servers.

When the system is initially configured, a voice server automatically configures the voice mail domain object of the directory in accordance with its own configuration set-up by setting the appropriate fields of the voice mail domain object. This configuration information in the voice mail domain directory object, and any configuration information held in the voice mail domain directory object subsequent thereto, is not in general transparent to any directory access applications and in particular is not to the user administration applications of the e-mail system.

Once the system is initially configured, its configuration may be subsequently altered. Such subsequent alteration of the system configuration is carried out by a unified messaging voice server, which updates the configuration information in the directory automatically responsive to control information, usually received remotely. Again, such updating of the configuration information in the directory is not transparent to the directory access applications. When a particular voice server updates the voice mail domain object, the other voice servers in the voice mail domain discover the update from the modifications made to the voice mail domain object in the directory. That is, there is no requirement for a voice server to notify all other voice servers in the domain when the update is made.

The unified messaging configuration information stored in the directory, as mentioned hereinabove, takes the form of a voice mail domain directory object. If the unified messaging system has more than one voice mail domain, then there will be a corresponding number of voice mail domain objects stored in the directory. A voice mail domain object contains a number of fields each defining a characteristic of the unified messaging system for that domain. As the voice mail domain object is proprietary, and opaque to the e-mail system administrator, then there is no possibility for the administration applications of the e-mail system to adapt or use the unified messaging system or configuration data in any meaningful way.

The voice mail domain object is provided as opaque to the e-mail system because of the proprietary nature of the information stored therein, which relates to the configuration of the system. The configuration information is valued to remain proprietary for commercial reasons.

However, some subset of the voice mail domain object contains configuration information that a vendor may not consider proprietary. For example the voice mail domain object may contain a field identifying the language(s) to be used by the system. The complete invisibility of the voice mail domain object to the administration applications means that the administration applications are not provided with any level of information concerning the system configuration, and as such there is no possibility for the user administration applications to provide any local adaptation of the unified messaging system.

It is an aim of the present invention to provide an improved unified messaging architecture. In particular, the present invention seeks to facilitate the capability to write unified messaging user administration software which requires access to at least some elements of the voice mail domain object of the unified messaging system, for example for range or field validation purposes.

SUMMARY OF THE INVENTION

In accordance with the present invention there is provided a method of configuring a multi-server system, comprising the steps of: defining a set of data comprising a plurality of proprietary fields common to the plurality of servers; and selecting at least one of said proprietary fields to be provided additionally as an open field.

Preferably, the invention is utilised in unified messaging system. Thus, the system is preferably a unified messaging system and the set of data comprising a plurality of proprietary fields is a voice mail domain object.

The method may further comprise providing a voice mail domain summary comprising said at least one open field.

The at least one open field may be accessible to an administration application of the system. The at least one open field may be accessible as read only data. An open field in the voice mail domain summary may be changed responsive to a change in the corresponding open field in the voice mail domain object. An open field in the voice mail domain object may be changed under the control of a voice server.

The voice mail domain summary is preferably provided in a directory of the unified messaging system.

In a further aspect the present invention provides a store for a multi-server system including means for storing a set of data comprising a plurality of proprietary fields, wherein at least one of said proprietary fields is selected to be additionally provided as an open field.

The multi-server system is preferably a unified messaging system, the store is a directory of the unified messaging system, and the set of data comprising a plurality of proprietary fields is stored in the directory as a voice mail domain object.

The directory may further include means for storing a voice mail domain summary comprising said at least one open field. The directory may be adapted such that the at least one open field is accessible to a user. The directory is preferably adapted such that the at least one open field is accessible by the user as read only data.

The directory may be adapted such that the open field in the voice mail domain summary is changed responsive to a change in the corresponding open field in the voice mail domain object.

The directory may be adapted such that an open field in the voice mail domain object is changed under the control of a voice server.

In a still further aspect the present invention provides a unified messaging system including a directory; at least one voice server defining a voice mail domain; and a user administration application, the directory being adapted to store a voice mail domain object corresponding to the at least one voice server and comprising a plurality of proprietary fields, wherein the directory is further adapted such that at least one of said fields is additionally stored as an open field accessible by a user administration application.

The directory is preferably further adapted such that the at least one of said fields accessible by the user administration application is stored as a voice mail domain summary.

The voice mail domain may comprise a plurality of voice servers. The unified messaging system may comprise a plurality of voice mail domains. The unified messaging system preferably comprises at least one message store and at least one client.

The present invention also provides a computer program product comprising computer program code for configuring a unified messaging system, the computer program code performing the steps of: defining a voice mail domain comprising a plurality of proprietary fields; and selecting at least one of said proprietary fields to be additionally accessible as an open field by an administration application of the system.

BRIEF DESCRIPTION OF THE FIGURES

The invention will now be described by way of example with reference to the accompanying drawings, in which.

DESCRIPTION OF THE PREFERRED EMBODIMENTS

The invention is now described herein with reference to an implementation in an example unified messaging system. The invention, however, is not limited in its applicability to such an example system.

Figure 1:
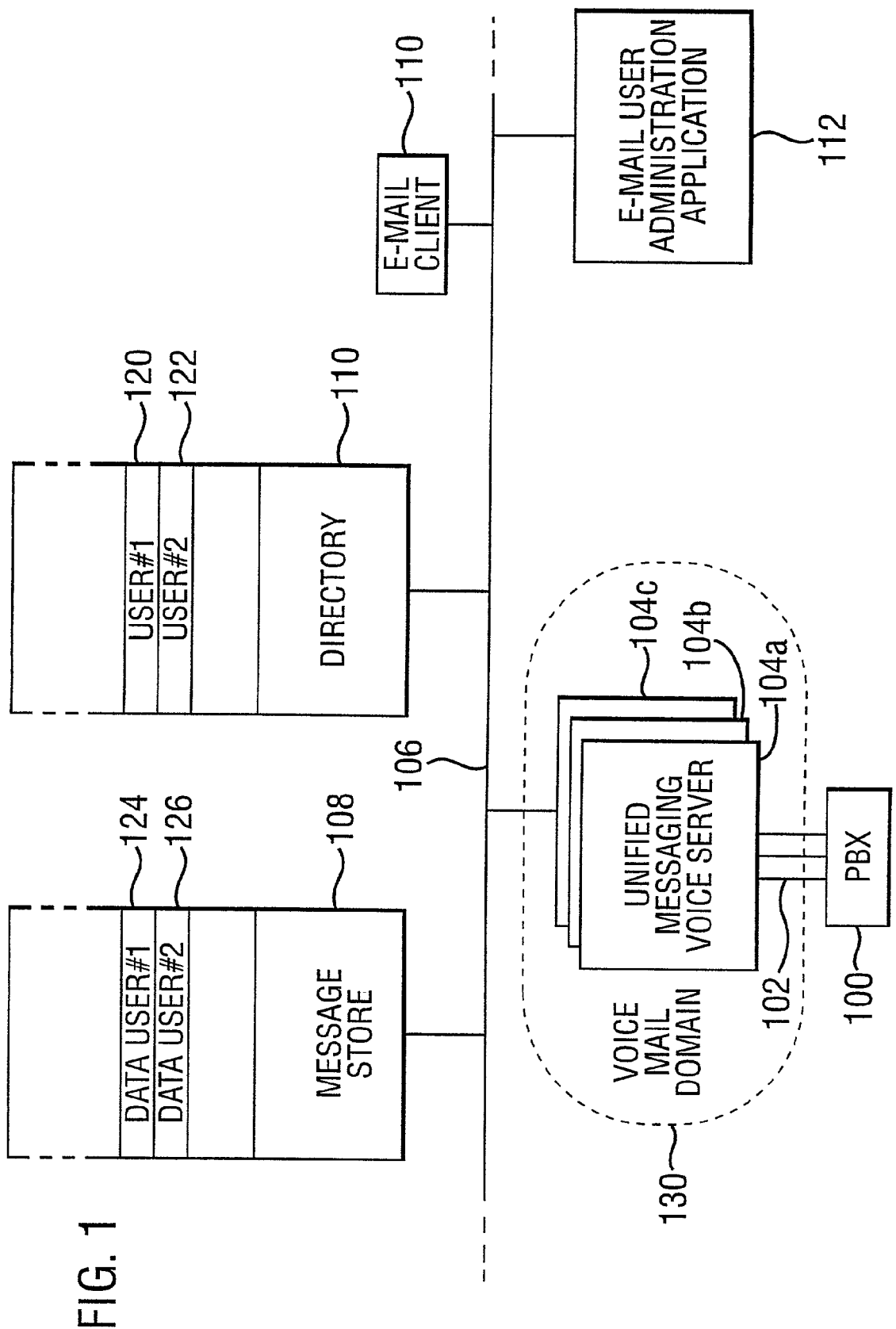
FIG. 1 illustrates the architecture of a known unified messaging system.

Referring to FIG. 1, there is illustrated the architecture of a typical unified messaging system. The system comprises one or more message stores 108, a directory 110, and at least one unified messaging voice server 104. In the example of FIG. 1, there is illustrated a set of three voice servers, 104a, 104b and 104c. Together, the set of three voice servers define a voice mail domain 130. In addition, an e-mail user administration application 112 and at least one e-mail client 110 are also inter-connected. The at least one unified messaging voice server 104 is connected via connections 102 to a PBX 100. The interconnection of the various elements shown in FIG. 1 is outside the scope of the present invention and is familiar to one skilled in the art. For ease of description herein, the various elements are shown as interconnected by a common network connection 106. However, in practice the various elements may not be connected on a common interface.

The at least one message store 108, the directory 110, the e-mail user administration application 112 and the at least one e-mail client 110 constitute the user e-mail system. The introduction of the unified messaging voice server 104, connected to the PBX 100, creates the unified messaging system. The unified messaging functionality introduced into the e-mail system integrates closely with the existing system structure. The unified messaging voice server 104 utilises the (e-mail) directory 110.

The message store 108 stores messages (e-mail and voice) associated with system users, and the directory 110 stores descriptive attributes associated with those system users.

The e-mail user administration application 112 is a management tool for the e-mail platform and is used, for example, to create a new user. The e-mail user administration application may be provided on a PC used by a system administrator. The e-mail user administration application is extended, in a unified messaging system, by unified messaging software to create a unified messaging administration application to enable the addition of unified messaging properties for e-mail users.

Unified messaging per user configuration information is included in the directory 110, rather than the voice server 104, so that there is referential integrity of all user data. Thereby when a user is deleted from the directory 110, all unified messaging data for that user is also removed from throughout the system. With the configuration information held in the directory 110, the unified messaging voice server 104 may interrogate the directory 110 to determine configuration information. The unified messaging voice server 104 is a gateway (a voice portal) into and out of the existing e-mail system.

The directory 110 includes an entry for every system user. For example, as shown in FIG. 1 the directory includes entries 120 and 122 for users 'user#1' and 'user#2' respectively. In addition, the at least one message store 108 includes stored data associated with each user, for example stored data 'datauser#1' and 'datauser#2' associated with the first and second users respectively. There may be several sets of stored data associated with any given user.

Figure 2:
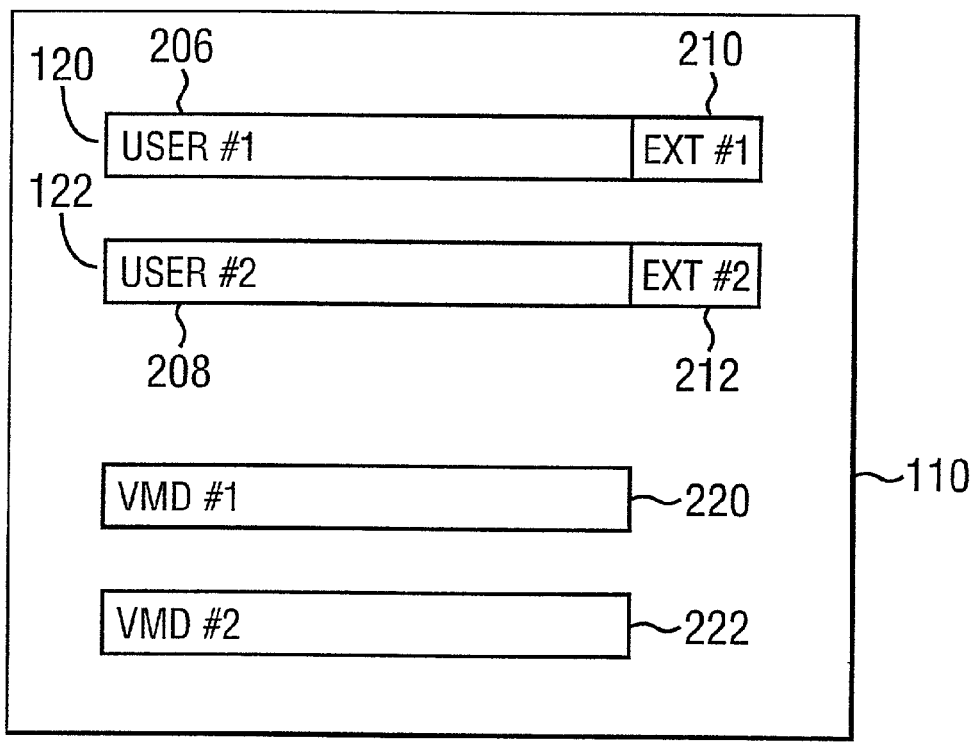
FIG. 2 illustrates the known format of user entries and VMD objects in a directory of a unified messaging system.

A standard e-mail directory entry, such as portions 206 and 208 of entries 120 and 122, will include various information, such as internet address of user, disk quota for user, and display name for user. Referring to FIG. 2, there is shown a modification to the standard e-mail system directory structure in accordance with one unified messaging system embodiment. In this embodiment, each user entry in the directory 110 is provided with a set of unified messaging extensions or additional appended storage. This extended portion of each user directory entry includes unified messaging information, and is manipulated by the unified messaging user administration application. As illustrated in FIG. 2, the entry 120 in the directory for the first user includes a portion 206 which corresponds to the conventional user entry for an e-mail system. The entry 120 additionally has an extended portion 210 that is provided for the purposes of this unified messaging system. Similarly for entry 122, there is a conventional entry 208 and an extended portion 212.

The additional appended storage associated with each user directory entry contains information associated with each e-mail user but which is specific to unified messaging functionality. This information may, for example, include the preferred language for the user. The provision of such extended information for users is a characteristic of unified messaging systems, and the type of information included in the additional appended storage will be familiar to one skilled in the art. Although in this described embodiment the additional appended storage for holding each user's unified messaging information is provided, the information may be stored elsewhere. However the provision of this information in the e-mail directory alongside the user's e-mail directory entry is clearly convenient and advantageous.

When unified messaging is introduced, it is also necessary to provide system configuration information identifying the unified messaging system installed and its functionality. As mentioned hereinabove, it is preferable for this information to be stored in the directory rather than in the voice server. This information is provided in the directory 110 as a voice mail domain (VMD) object. The provision of this configuration information in the shared directory is to allow access by multiple voice servers in a common voice mail domain.

It is possible that the system may have more than one voice mail domain (VMD), e.g. a first voice mail domain VMD#1 and a second voice mail domain VMD#2. In such a case the directory 110 is provided with configuration information for each voice mail domain, comprising a respective VMD object. As shown further in FIG. 2, there are provided two voice mail domain objects VMD#1 220 and VMD#2 222 corresponding to the respective voice mail domains provided.

Respective voice mail domains support different configuration information, for example minimum password lengths and languages. The VMD object for each VMD includes a number of fields which define all the configuration information for that VMD.

The internal structure of the VMD information, defined in the VMD object, is proprietary and opaque to the e-mail user administration applications. Thus the VMD object for each VMD contained in the directory is not readable by the e-mail user administration applications. The voice server creates the VMD object in the directory. For example, if German is added as a language to a voice server, then the voice server automatically updates the associated VMD object in the directory.

The provision of a VMD object without an open schema or otherwise published definition means that a user administration application cannot use generic system tools to view, validate and update the information contained within the voice mail domain object.

In accordance with a preferred embodiment of the present invention there is created a VMD summary associated with each VMD object in the directory. The VMD summary is stored in the directory with its associated VMD object. The VMD summary contains fields that correspond to certain fields of the VMD object that it is determined are to be open to third parties. The fields of the VMD object that are to be made available to third parties are defined as open fields. The open fields may not be presented in the VMD summary in the same format as they are contained in the VMD object. For example, the fields may be encrypted in the VMD object and decrypted in the VMD summary. The fields in the VMD summary may be presented in a more user friendly format. For example the VMD object fields may be binary fields, and may be presented in the VMD summary as ASCII fields. Thus an open field provided in the VMD object is preferably transformed and then stored in the VMD summary.

Figure 3:
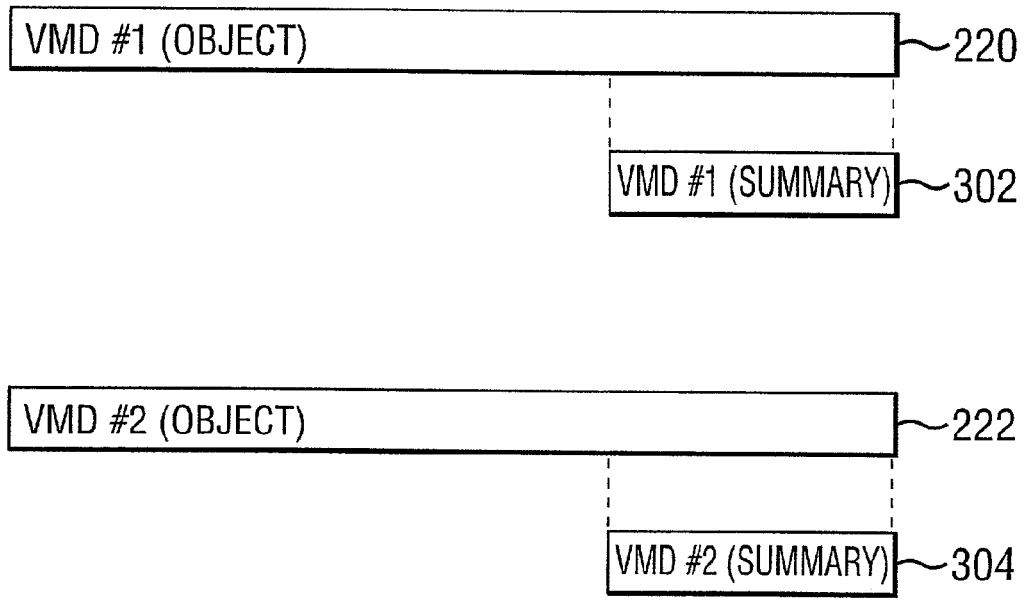
FIG. 3 illustrates the adaptation of the contents of the directory for a unified messaging system in accordance with the present invention.

Referring to FIG. 3, there is illustrated the VMD objects 220 and 222 of FIG. 2 together with their respective VMD summaries 302 and 304. It should be noted that the open fields of the VMD object which form the VMD summary are not necessarily adjacent fields.

The VMD object may include, for example, 100 fields, and the VMD summary may include, for example, 10 fields. The VMD summary is a user readable string (or a collection thereof). The fields selected for inclusion in the VMD summary are those fields that are specifically useful to a unified messaging user administration application. Some examples of such fields are given hereafter.

One example is the language fields. As discussed above, a unified messaging user administration program configures the user directory entry additional appended storage (210, 212) for each e-mail user. One of the fields in such an entry for each user that the unified messaging user administration program may configure is the language to be used for that user. If the languages supported by the unified messaging system are visible to the user administration program in the VMD summary, then the user can be certain of selecting a language for a user which is supported by the system. Thus if the VMD summary shows that English and German are supported, the unified messaging user administration program will not set a user's language in the directory as being French, for example. However, without the VMD summary the user administration program may well set a user's language as an unsupported language. In addition, if a voice server is subsequently modified to support a new language the VMD object is updated, via the VMD object, and this information is visible to the unified messaging user administrator. In this way the unified messaging user administrator, in setting up a new user, may be provided with a 'drop-down' box which lists the available languages, based on information retrieved from the VMD summary.

Other information provided in the VMD object which may be defined as open fields include whether the system supports call waiting or find-me capabilities, mailbox lengths, extension lengths (i.e. telephone number), and minimum password lengths.

Preferably the rendering transparent of the unified messaging attributes to the e-mail user administration application in the VMD summary is read-only, and the user system may never write thereto. However, there is the possibility that in more advanced systems the invention may provide for the VMD summary to be written to by the user system.

In the described preferred embodiment the open fields are provided in a VMD summary distinct from the VMD object. However in an alternative embodiment the VMD object may be masked such that open fields are readable directly therefrom. However, as discussed hereinabove, the fields in the VMD object or the VMD object in its entirety may be encrypted. In such a case, the masking would have to provide a transform for open fields.

A third party developer is thus now able to provide the configuration of the unified messaging functionality in the e-mail user administration application. Through the provision of part of the VMD object in a visible fashion in accordance with the present invention, the system administrator may write an extended unified messaging user administration program. More flexibility in determining a particular user's additional appended storage, or unified messaging extension data, in the directory is thus provided by the provision of a VMD summary.

The provision of open fields in the VMD summary gives the user administration applications the flexibility to customise the local unified messaging system independently. For example, the VMD summary may include the definition of the system password length. The user administrator may therefore have the flexibility to change passwords knowing what the password length will be.

Although the invention has been described herein with reference to a particular implementation in a unified messaging system, the applicability of the invention is more general. The invention more generally applies to any multi-server enviromnent where data, shared by multiple servers, is stored in a single data object and is valued to remain proprietary. Another example environment within which the present invention may be utilised is any multi-server e-mail layered product, such as a fax transmission gateway.

The skilled person will readily identify other possible implementations of the present invention beyond those given herein. The scope of the present invention is defined by the appended claims, and the skilled person will understand that modifications and variations to the invention as descried herein are possible without departing from the scope of the invention as defined in the claims.

The invention claimed is:

1. A method of configuring a unified messaging system including a voice mail domain and an administration application, the method comprising the steps of:
    a. defining a voice mail domain object comprising a plurality of fields proprietary to the voice mail domain, said plurality of fields proprietary to the voice mail domain comprising closed fields not accessible by the administration application; and
    b. selecting at least one of said plurality of fields proprietary to the voice mail domain to be provided additionally as an open field accessible by the administration application.

2. A method according to claim 1, further comprising providing a voice mail domain summary comprising said at least one open field.

3. A method according to claim 1 wherein the at least one open field is accessible as read only data.

4. A method according to claim 2 wherein an open field in the voice mail domain summary is changed responsive to a change in the corresponding open field in the voice mail domain object.

5. A method according to claim 1 wherein an open field in the voice mail domain object is changed under the control of a voice server.

6. A method according to claim 2 wherein the voice mail domain summary is provided in a directory of the unified messaging system.

7. A unified messaging system comprising:
    a directory;
    at least one voice server defining a voice mail domain; and
    an administration application;
    wherein the directory is adapted to store a voice mail domain object corresponding to the at least one voice server and comprising a plurality of fields proprietary to the voice mail domain, said plurality of fields proprietary to the voice mail domain comprising closed fields not accessible by the administration application; and
    wherein the directory is further adapted such that at least one of said plurality of fields proprietary to the voice mail domain is additionally stored as an open field accessible by the administration application.

8. A unified messaging system according to claim 7 wherein the directory further comprises a means for storing a voice mail domain summary comprising said at least one open field.

9. A unified messaging system according to claim 7 wherein the directory is further adapted such that the at least one open field is accessible by the administration application as read only data.

10. A unified messaging system according to claim 7 wherein the directory is further adapted such that the open field in the voice mail domain summary is changed responsive to a change in the corresponding open field in the voice mail domain object.

11. A unified messaging system according to claim 7 wherein the directory is further adapted such that an open field in the voice mail domain object is changed under the control of a voice server.

12. A unified messaging system according to claim 7 wherein the directory is further adapted such that the at least one of said fields accessible by the administration application is stored as a voice mail domain summary.

13. A unified messaging system according to claim 7 wherein the voice mail domain comprises a plurality of voice servers.

14. A unified messaging system according to any one of claims 7 to 13 further comprising a plurality of voice mail domains.

15. A unified messaging system according to any one of claims 7 to 13 further comprising at least one message store and at least one client.

* * * * *

UNITED STATES PATENT AND TRADEMARK OFFICE
CERTIFICATE OF CORRECTION

PATENT NO. : 7,327,836 B2 Page 1 of 1
APPLICATION NO. : 10/151486
DATED : February 5, 2008
INVENTOR(S) : C. N. Didcock et al.

It is certified that error appears in the above-identified patent and that said Letters Patent is hereby corrected as shown below:

Title page, column 2, Item (56), please insert the following references under "Other Documents":

E.C. Anderl et al., "An Enhanced Message Networking Topology: Multimedia Messaging with the Intuity$^{TM}$ Interchange Server," Bell Labs Technical Journal, Vol. 3, No. 2, pages 124-135, April 1, 1998.

B.M. Elliot, "Unified Messaging: The VPIM Initiative," Business Communications Review, pages 43-47, May 1, 1997.

G. Vaudreuil, "Networked Voice Messaging," Vol. 8, No. 11, pages 25-27, 1994.

Signed and Sealed this

Seventeenth Day of June, 2008

JON W. DUDAS
*Director of the United States Patent and Trademark Office*